United States Patent [19]

Markfelder et al.

[11] 4,025,129
[45] May 24, 1977

[54] FRICTION BEARING WITH SLIDING MEMBERS

[75] Inventors: Günter Markfelder; Wolfgang Teich, both of Schweinfurt, Germany

[73] Assignee: Kugelfischer Georg Schafer & Co., Germany

[22] Filed: Jan. 15, 1976

[21] Appl. No.: 649,241

[30] Foreign Application Priority Data

Jan. 17, 1975 Germany .......................... 2501702

[52] U.S. Cl. ................................ 308/3 R; 308/72; 308/238
[51] Int. Cl.² ........................................ F16C 33/12
[58] Field of Search ................ 308/72, 237 R, 194, 308/239, 238, 3 R, 3.5

[56] References Cited

UNITED STATES PATENTS

| 3,819,241 | 6/1974 | Memmel ............................. 308/3 R |
| 3,897,936 | 8/1975 | Berthold et al. ...................... 308/72 |
| 3,926,094 | 12/1975 | Kurichh et al. ....................... 308/72 |

FOREIGN PATENTS OR APPLICATIONS 315,590    9/1972    Austria ............................... 308/3 R Primary Examiner—Joseph F. Peters, Jr.
Assistant Examiner—Richard A. Bertsch
Attorney, Agent, or Firm—Brumbaugh, Graves, Donohue & Raymond

[57] ABSTRACT

A friction bearing having spaced-apart inner and outer bearing rings with a plurality of separate sliding members interposed therebetween, the individual sliding members being restrained by respective generally annular members positioned adjacent and on substantially encompassing the sliding members, and fixedly attached to one of the bearing rings.

6 Claims, 4 Drawing Figures

FRICTION BEARING WITH SLIDING MEMBERS

The present invention relates to a large friction bearing, and, more particularly, to a flexible bearing consisting of an inner and an outer ring having spaced-apart spherical surfaces facing each other and a plurality of separate sliding members arranged in between.

There are known large-size friction bearings of the above kind. According to German Design Pat, No. 6,808,807, corresponding to U.S. Pat. No. 3,602,560, the sliding members are surrounded by a cage in one piece, attached to one of the rings. This keeps the sliding members from moving about. In that construction, it is true, production of the rings is simple. However, a cage having a large number of openings for the sliding members must be fabricated. In the case of bearings of large size, fabrication of the cage is very complicated and costly. According to German Design Patent No. 7,144,301, the sliding members are secured in depressions of one ring by means of screws. While this affords an adequate fixation, fabrication of the ring with depressions is troublesome and expensive. German Design Patent No. 7,139,476, which corresponds to U.S. Pat. No. 3,819,241, describes a large flexible bearing having a cage for fixation and supporting rings for stabilization of the sliding members. A number of problems are solved in this way, but nevertheless, for the reasons already given, the construction is a costly one.

Thus the object of the invention is to improve a large friction bearing, in particular a flexible bearing, of the kind initially mentioned, so that the sliding members shall be retained by simple and inexpensive means and at the same time adequately supported.

In accordance with a preferred embodiment of the invention, each sliding member is surrounded by preferably annular members attached to a ring near one face, for example by welding or soldering. Thus a secure attachment of the sliding members to one of the rings is achieved by extremely simple means, without thereby impairing load capacity and dependability. The annular members are of some height, so that a stabilization of the sliding members is achieved without additional outlay.

Advantageously, the preferably annular members consist of short pieces of tubing. In this way they may readily be cut from long tubes according to the height desired.

To improve the load capacity of the bearing, the height of the preferably annular members may be proportioned so that they will transmit loads as well. In that case it is expedient to make these parts out of a bearing material of greater strength.

In an alternate embodiment that serves very well in practice, the annular members consist of two short pieces of tubing, the piece attached to one ring being made of weldable high-strength material, while the other piece, extending about up to the sliding surface of the slide members, is made of a bearing material of comparatively high strength. Because of the enlarged area of friction, a higher load capacity of the flexible bearing results. Besides, the second piece of tubing provides an additional stabilization of the sliding member in its friction zone. In this embodiment, it is expedient for the touching faces of the pieces of tubing to have an annular tongue and groove respectively. This provides a fixation and centering of the two annular parts relative to each other.

According to still another embodiment, the preferably annular members may surround or be surrounded by an intermediate ring extending from the sliding surface of the slide members to slightly beyond the free faces of the preferably annular members, and some clearance from the matching rings being left over. In this case, fixation and stabilization of the sliding members are especially adapted to conditions of operation. In event of any wear, the intermediate ring can shift axially according to the abrasion of the sliding members, thus not losing its supporting function in any phase of operation. It itself is attached in turn to one of the rings, being embraced or framed by the preferably annular members.

The special further advantages of all embodiments consist in that a very compact arrangement of the sliding members is made possible, achieving high load capacity of the bearing. The rings may be produced by simple turning and grinding operations. Replacement of the sliding members when worn is likewise readily possible, especially in the embodiment last mentioned.

For a more complete understanding of the invention reference may be had to the following detailed description of exemplary embodiments of the invention taken in conjunction with the figures of the accompanying drawing, in which.

Figure 1:
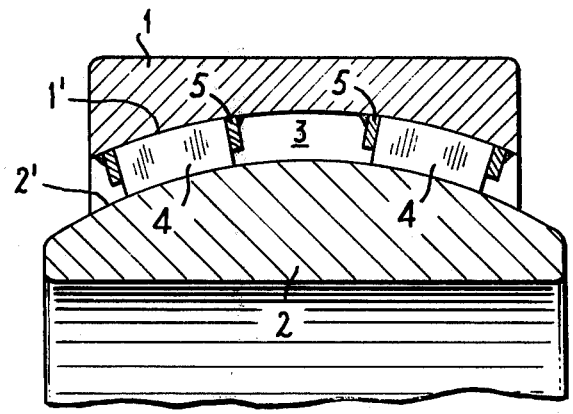
FIG. 1 shows a partial section of a large flexible bearing in accordance with one embodiment of the invention.
Figure 2:
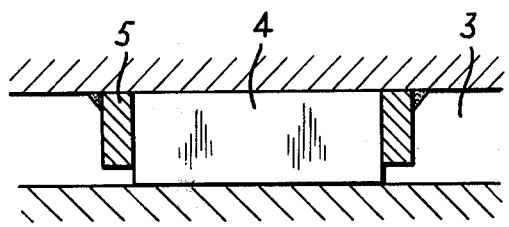
FIG. 2 shows an enlarged portion of FIG. 1, with sliding members and annular members attached in accordance with the invention.

The large flexible bearing consists, according to FIGS. 1 and 2, of an outer bearing ring 1 having a spherical bore 1' and an inner bearing ring 2 having a likewise spherical contour 2'. Between the two, a gap 3 is provided, in which is arranged a plurality of separate sliding members 4 to transmit the loads. These members, as may also be seen in FIG. 2, are bounded by a retaining ring 5. The latter is connected at one face to the outer ring 1 by welding, thus affording a fixation by simple means in all operating conditions. If the rings 5 extend about into the region of the bearing surfaces of the members 4, the latter are at the same time stabilized under high load and high temperature. Still another advantage consists in that the rings 5 may be simply fabricated by cutting them from lengths of commercially available tubing. The sliding members 4 may be prevented from dropping out of the retaining rings 5 by means of mortises, or tongues and grooves, on the contour and/or bore surfaces, with elastic spring action.

Figure 3:
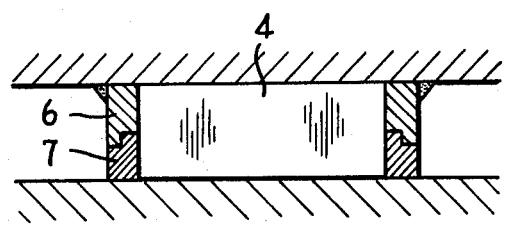
FIG. 3 shows a similar portion in an alternate embodiment with a different mode of attachment of the sliding members.

In FIG. 3, the preferably annular members each consist of two short pieces of tubing 6 and 7. The fastening ring 6 may expediently consist of weldable material, so that it can readily be attached to one bearing ring by welding. The other short piece of tubing 7 is made of a bearing material of comparatively high strength. Since it likewise fills the remaining gap between the fastening ring 6 and the bearing surface of the other bearing ring, a transmission of load is possible in this additional annular area as well; besides, the inserted sliding members 4 are stabilized in this zone.

Figure 4:
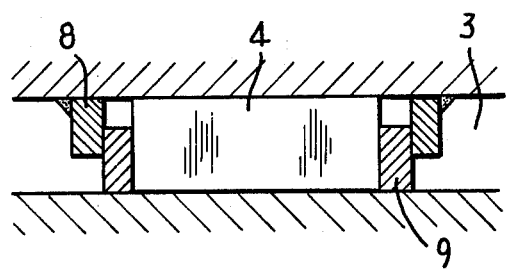
FIG. 4 shows a similar portion of another alternate embodiment of the device according to the invention.

In the embodiment of FIG. 4, an intermediate ring 9 is added between the ring 8 secured to one bearing ring by welding and the sliding member 4. In this case, the retaining ring 8 extends over a lesser portion of the height of the clearance 3, while the intermediate ring 9 extends from the bearing surface of the members 4 to just beyond the top of the retaining rings 8. Ring 8 serves primarily for fixation of the sliding members. The intermediate ring 9 effects positive support of the sliding member 4 in every operating condition, in particular also when some wear of the sliding member has occurred. For in the latter case, it is shifted in axial direction without any loss of function.

Thus there is provided, in accordance with the invention, a novel and improved form of large flexible bearing wherein the sliding members interposed between the respective ring surfaces are retained in their intended positions under a wide range of operating conditions by simple and inexpensive means.

It will be understood by those skilled in the art that the above disclosed embodiment is merely exemplary and that it is susceptible of modification and change without departing from the spirit and scope of the invention. Therefore, the invention is not deemed to be limited except as defined in the appended claims.

We claim:

1. In a friction bearing having inner and outer bearing members, each having a spherical surface, the spherical surfaces being spaced-apart and facing each other, and a plurality of separate sliding members arranged in between the spherical surfaces and adapted for sliding movement relative to one of the bearing members, the improvement comprising a plurality of individual generally annular members, one for each of the sliding members, each of said annular members being positioned adjacent and substantially encompassing a respective sliding member for restraining movement of the respective sliding member relative to the other bearing member, wherein said annular members are fixedly attached to the spherical surface of the other bearing member.

2. In a friction bearing as claimed in claim 1, wherein said annular members comprise short pieces of tubing.

3. In a friction bearing as claimed in claim 1, wherein said annular members extend about up to but short of a bearing surface of a respective sliding member adapted to engage the one bearing member, said annular members consisting of a bearing material of comparatively high strength.

4. In a friction bearing as claimed in claim 1, wherein said annular members each consist of two short pieces of tubing, one of said pieces being attached to the other bearing member and made of weldable material of high strength, the other of said pieces extending about to a bearing surface of a respective sliding member adapted to engage the one bearing member and consisting of a bearing material of comparatively high strength.

5. In a friction bearing as claimed in claim 4, wherein said short pieces of tubing respectively have an annular groove and an annular tongue on contiguous surfaces thereof.

6. In a friction bearing as claimed in claim 1, comprising a plurality of intermediate rings, one for each of the sliding members, each of said intermediate rings being interposed between a respective annular member and a respective sliding member in embracing relation with the respective annular member and extending from a bearing surface of the respective sliding member adapted to engage the one bearing member toward the other bearing member to somewhat beyond the free rims of the respective annular member, but with clearance in respect to the other bearing member.

* * * * *